United States Patent
Choinski (10) Patent No.: US 6,770,238 B2
(45) Date of Patent: Aug. 3, 2004

(54) METHOD AND DEVICE FOR BLOW-FORMING CONTAINERS

(76) Inventor: Julian Choinski, Conventstrasse 7, Hamburg (DE), 22089

( * ) Notice: Subject to any disclaimer, the term of this patent is extended or adjusted under 35 U.S.C. 154(b) by 358 days.

(21) Appl. No.: 10/057,661

(22) Filed: Jan. 25, 2002

(65) Prior Publication Data

US 2002/0093126 A1 Jul. 18, 2002

Related U.S. Application Data

(63) Continuation of application No. PCT/DE00/02453, filed on Jul. 25, 2000, and a continuation of application No. PCT/DE00/02452, filed on Jul. 25, 2000.

(30) Foreign Application Priority Data

Jul. 27, 1999 (DE) .......................................... 199 35 266
Jul. 27, 1999 (DE) .......................................... 199 35 267

(51) Int. Cl.[7] .......................... B29C 49/30; B29C 49/64
(52) U.S. Cl. ...................... 264/535; 264/537; 425/526; 425/534; 425/538
(58) Field of Search ................................ 264/535, 537; 425/526, 534, 538

(56) References Cited

U.S. PATENT DOCUMENTS

| 4,261,949 A | | 4/1981 | Spurr et al. | |
|---|---|---|---|---|
| 5,169,654 A | * | 12/1992 | Koga | 425/522 |
| 5,683,729 A | * | 11/1997 | Valles | 425/526 |
| 5,783,232 A | * | 7/1998 | Roos et al. | 425/526 |

FOREIGN PATENT DOCUMENTS

| DE | 23 52 926 | | 4/1975 |
|---|---|---|---|
| DE | 31 09 267 | A1 | 4/1982 |
| DE | 42 12 583 | A1 | 10/1993 |
| DE | 43 40 291 | A1 | 6/1995 |
| DE | 196 46 365 | A1 | 5/1998 |
| DE | 297 16 268 | U1 | 11/1998 |
| DE | 198 10 238 | A1 | 5/1999 |
| DE | 197 57 818 | A1 | 7/1999 |
| EP | 0 435 347 | A2 | 7/1991 |
| FR | 2 720 679 | | 12/1995 |
| WO | WO 95/05933 | | 3/1995 |
| WO | WO 95/33616 | | 12/1995 |
| WO | WO 96/08356 | | 3/1996 |
| WO | WO 96/26826 | | 9/1996 |

* cited by examiner

Primary Examiner—Suzanne E. McDowell
(74) Attorney, Agent, or Firm—Harness, Dickey & Pierce, P.L.L.C.

(57) ABSTRACT

The method and the device are used for blow forming containers of a thermoplastic material. The preforms that are used are first temperature treated and then shaped into containers in the area of at least one blow station. Moulds to define the container shape are held by mould supports. At least two preforms are simultaneously shaped into containers within each blow station. Positioning of the preforms is done such that the preforms assume a positioning relative to one another when entering the blow station that differs from the positioning during the blow forming process. Spacing of the preforms relative to one another is changed during transport between entry into the blow station and blow positioning. In addition to this first change in spacing, a second change in spacing between adjacent preforms is performed relative to one another.

20 Claims, 9 Drawing Sheets

METHOD AND DEVICE FOR BLOW-FORMING CONTAINERS

CROSS REFERENCE TO RELATED APPLICATIONS

This application is a continuation of PCT Application No. PCT/DE00/02453, filed Jul. 25, 2000 claiming priority on German Application No. 199 35 266.6, filed Jul. 27, 1999 and PCT Application No. PCT/DE00/02452 filed Jul. 25, 2000 and claiming priority on German Application No. 199 35 267.4, filed Jul. 27, 1999.

BACKGROUND AND SUMMARY OF THE INVENTION

The invention relates to a device for blow-forming containers of a thermoplastic material that has a heater unit for temperature treating preforms and at least one blow station equipped with mould supports that can be positioned relative to one another and wherein at least two cavities are located in the area of the blow station whose longitudinal axes have a spacing relative to one another that is larger than a spacing between the preform longitudinal axes of adjacent preforms in the vicinity of the heater unit.

The invention additionally relates to a method for blow-forming containers of a thermoplastic material, wherein preforms are temperature-treated and shaped into containers in the area of at least one blow station and wherein moulds to define the container shape are held by mould supports that can be positioned by support arms, and wherein at least two preforms are simultaneously shaped into containers within each blow station and are positioned such that the preforms assume a positioning relative to one another when entering the blow station that differs from the positioning during the blow forming process.

Devices of this nature are used to shape preforms of a thermoplastic material, for example preforms of PET (polyethylene terephthalate), into containers within a blow-forming machine. Typically, such a blow-forming machine has a heater unit and a blow unit, in which the previously temperature treated preform is expanded to a container by biaxial orientation. The expansion is accomplished with the use of compressed air, which is introduced into the preform to be expanded. The process sequence of such an expansion is explained in DE-OS 4,340,291. The device is also fitted out to remove completed blow-formed containers from the blow unit and to transport them further.

The basic structure of a blow station for forming containers is described in DE-OS 4,212,583. Options for temperature treatment of the preforms are explained in DE-OS 2,352,926.

Within the device for blow forming, the preforms and the blow-formed containers can be transported by means of various handling devices. One proven technique in particular is the use of transport mandrels onto which the preforms are placed.

The preforms can also be handled with other carrying devices, however. For example, the use of grippers for handling preforms is described in FR-OS 2,720 679. An expansion mandrel that can be introduced into a mouth area of the preform for the purpose of holding is explained in WO 95 33 616.

The aforementioned handling of the preforms takes place, on the one hand, as part of the so-called two-stage process, in which the preforms are first manufactured in an injection moulding process, then are stored temporarily, before later being conditioned with respect to their temperature and blow formed into containers. On the other hand, application is also found in the so-called one-stage process, in which the preforms are appropriately temperature treated and then blow formed immediately after their production by injection moulding and adequate hardening.

As regards the blow stations employed, various different embodiments are known. In blow stations that are arranged on rotating transport wheels, one frequently encounters mould supports that swing open in a book-like fashion. In stationary blow stations, which are especially suitable for accommodating multiple cavities for container moulding, plates that typically are arranged parallel to one another are used as mould supports.

For the most part, one container is blow formed at a given time in a blow station. However, especially in the manufacture of small containers, it can be advantageous to simultaneously blow mould two or more preforms into containers in one blow station. Such a method is described in WO-PCT 95/05933 and WO-PCT 96/26826, for example. Simultaneous expansion of multiple preforms in conjunction with rotating blow wheels is already known in the so-called one-stage process and in extrusion blowing, as well. In blow forming machines with stationary moulds, the majority of machines are equipped with blow stations that have multiple cavities.

Different possibilities for feeding a plurality of preforms to a blow station with multiple cavities, and for removing a plurality of blow-formed containers from such blow stations, are described in DE-OS 198 10 238.

The known designs for blow stations with multiple cavities still cannot meet all the requirements placed on production of containers for a high output rate combined with gentle material handling and high mechanical reliability.

The object of the present invention is to design a device of the aforementioned type that supports gentle material handling with high production output.

This object is attained in accordance with the invention in that a positioning element that changes the spacing of the preforms relative to one another is located in the area of the blow station, and in that a spreader element that likewise modifies the spacing of the preforms is also located between at least one heating element and the blow station.

Another object of the present invention is to specify a method of the aforementioned type such that simultaneous transfer of at least two preforms to the blow station is supported.

This object is attained in accordance with the invention in that, between at least one of the heating elements that heat treats the preforms and the blow station, at least one additional change in the spacing of adjacent preforms relative to one another is performed.

The variable-spacing handling of the preforms in the area of the blow station makes it possible to feed the preforms next to one another in the area of the blow station, and to wait until the vicinity of the blow station to define the final positioning and to provide the spacing of the preforms intended for blow-forming. Conversely, after completion of blow-forming and separation of the blow-formed containers from the cavities, definition of spacing of the blow-formed containers can be undertaken in such a way that the optimal spacing conditions required for output are present.

The proposed at least two-step spacing change of the preforms makes it possible to achieve improved kinematics, since the localization of each change in spacing can be adapted to the method of operation of the handling and transfer devices used without it being necessary to predefine a fixed value for a spacing change to be performed in the area of an individual localization. The division of the spacing change among several different locations also makes possible the compact handling of two or more preforms or containers, since the largest spacing, which requires the most handling room, is not established until the preforms are within the blow station.

A compact configuration is supported in that the spreader element is arranged in the vicinity of the heater unit.

Another embodiment consists in that the spreader element is arranged after the heater unit in the direction of preform transport.

A transport motion of the preforms can be carried out with a simultaneous spreading motion in that the spreader element is embodied as a chainlike deflection of support elements for the preforms.

Great flexibility of application can be achieved in that the spreader element is located in the area of a transfer wheel.

High functional reliability can be supported in that a plurality of spreader elements are located in the area of the transfer wheel located between the heater unit and the blow wheel.

A simple basic mechanical structure is provided in that the spreader element has two spreader levers and an actuator.

A mechanical implementation as an articulated lever can be achieved in that the spreader element has positioning levers in addition to the spreader levers, and in that the positioning levers are pivotably connected to the spreader levers as well as to the actuator.

High precision of reproducibility in the execution of actuating motions is achieved by the means that the actuator has a cam roller that can be acted upon by a mechanical cam control system.

The mechanical complexity of the system can be minimized in that a two-step spacing change is performed.

Optimum adaptation of each spacing change to the existing limit conditions of the design can be accomplished in that a three-step spacing change is performed.

Continuous material handling is supported in that the relative spacing of the preforms is increased at every change of spacing.

BRIEF DESCRIPTION OF THE DRAWINGS

Example embodiments of the invention are represented schematically in the drawings.

DESCRIPTION OF THE PREFERRED EMBODIMENT

Figure 1:
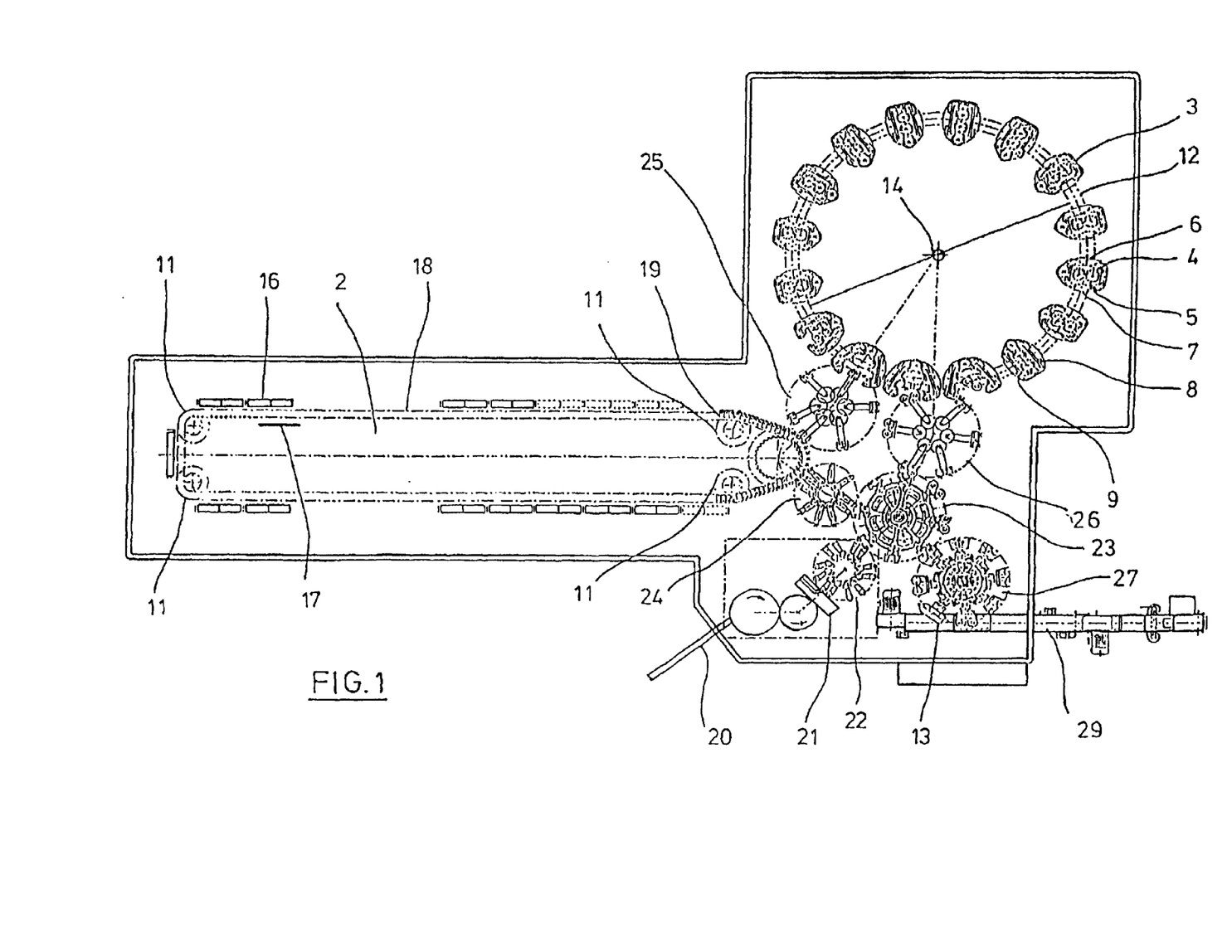
FIG. 1 is a general view of a device for blow-forming containers that has a heater unit, a rotating blow wheel equipped with blow stations, and various transfer devices.

FIG. 1 shows the basic structure of a blow forming machine that is equipped with a rotating blow wheel (12) and a heater unit (2) for preforms (1) requiring temperature treatment. Arranged along a circumference of the blow wheel (12) are blow stations (3), each of which has mould supports (4, 5). The mould supports (4, 5) are held by support arms (6, 7) and are used to position mould elements, typically mould halves (8, 9).

The support arms (6, 7) are mounted such that they can rotate relative to a base pivot bearing (10). The blow wheel (12) rotates relative to a blow wheel axis (14), and the base pivot bearing (10) is arranged to face the blow wheel axis (14) in the radial direction.

In the embodiment shown in FIG. 1, the heater unit (2) is provided with a conveyor chain (18) that transports the preforms (1) which are to be heated along the heating elements (16). The heating elements (16) can be embodied as IR radiators, for example. However, it is also possible to provide radiators that operate in other frequency ranges, or a convection heater. In the embodiment shown, the heating elements (16) are located along one side of the transport path of the preforms (1), and reflectors (17) are provided opposite to the heating elements (16). In principle, a double-sided arrangement of heating elements (16) can also be implemented.

In the area of the conveyor chain (18), the preforms (1) are held by support elements (19). The support elements (19) can be implemented as transport mandrels on which the preforms (1) are placed, for example. It is likewise conceivable to hold the preforms (1) using grippers or expansion mandrels. A further variant consists of the use of support elements (19) that circulate in the area of the heater unit and hold separate transport mandrels.

In particular, it is envisioned that the conveyor chain (18) be constructed of mounting elements joined to one another in a chainlike manner, each of which holds the separate support elements (19) for the preforms (1). The conveyor chain (18) is moved with the aid of guide wheels (11).

The preforms (1) can be fed in such a manner that the preforms (1) are initially moved along a conveyor rail (20), where the preforms (1) are arranged with their mouths facing up, to a turning device (21) that rotates the preforms (1) so their mouths face down and transfers them to a feed wheel (22). The feed wheel (22) is coupled to the heater unit (2) by transfer wheels (23, 24). In particular, it is envisioned that the preforms (1) will be placed on the support elements (19) as early as in the area of the transfer wheel (23) that faces the feed wheel (22).

The heater unit (2) is coupled to the blow wheel (12) by a transfer wheel (25), and finished, blow-formed containers (13) in the area of the blow station (3) are transferred from the blow wheel (12) to a discharge wheel (26). The discharge wheel (26) is coupled by the transfer wheel (23) to an output wheel (27) that moves the blow-formed containers (13) to the area of an output track (29). A useful change in the spatial orientation of the blow-formed containers (13) can be performed in the area of the output wheel (27).

In order to facilitate the introduction of a large amount of heat into the preforms (1) without the danger of overheating the outer surface, blowers that introduce cooling air to the area of the preforms (1) can be arranged in the area of the heater unit (2) in addition to the heating elements (16). For example, it is possible to position heating elements (16) and blowers in an alternating sequence in the direction of transport of the preforms (1).

In order to be able to form a preform (1) into a container (13) in such a way that the container (13) has material properties that ensure long-term usability of foodstuffs, especially beverages, placed in the container (13), special process steps must be followed in the heating and orientation of the preforms (1). Moreover, advantageous effects can be achieved by following special dimensioning guidelines.

A variety of plastics can be used as the thermoplastic material. Examples of plastics that may be used include PET, PEN and polypropylene.

The preform (1) is expanded during the orientation process by the introduction of compressed air. The introduction of compressed air is divided into a pre-blow phase during which a gas, for example compressed air, is introduced at low pressure, and a subsequent main blow phase during which gas is introduced at a higher pressure. During the pre-blow phase, compressed air in the range from 10 bar to 25 bar is typically used; during the main blow phase, compressed air in the range from 25 bar to 40 bar is introduced.

Figure 2:
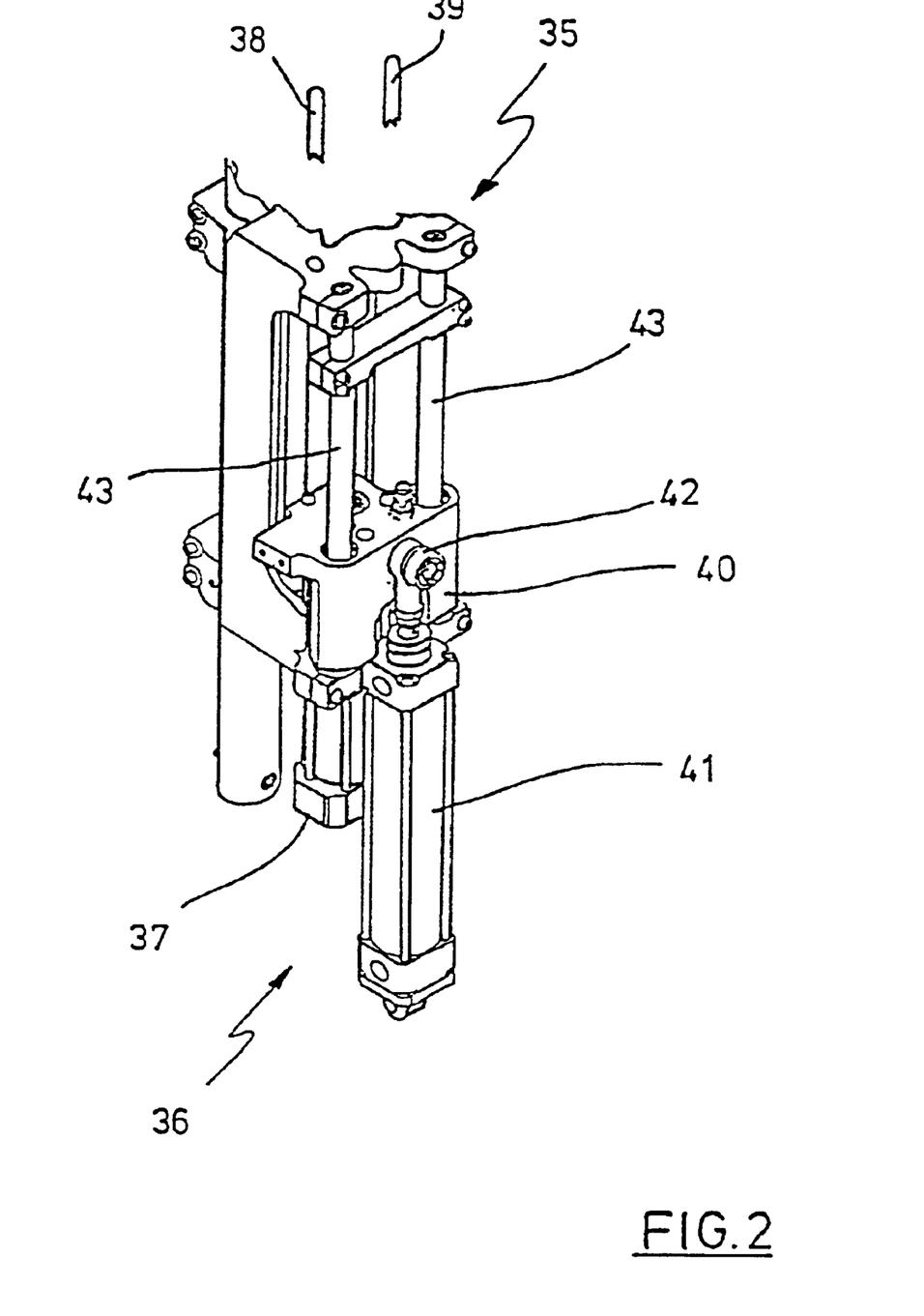
FIG. 2 is a perspective view of the drive elements for a stretching system.

FIG. 2 shows a possible embodiment of a stretching device (35) that is designed to insert stretching rods (38, 39) into the preform (1) to perform longitudinal stretching prior to blowing of the preform (1). In particular, it is possible to simultaneously insert two or more stretching rods (38, 39) into their respective preforms (1) in the blow station (3) in question using the stretching device (35).

In the embodiment shown in FIG. 2, the stretching system is designed such that a tandem arrangement of two cylinders (36) is provided. First, the stretching rods (38, 39) are moved to the area of the base of the preform (1) by a primary cylinder (37) prior to the start of the actual stretching process. During the actual stretching process, the primary cylinder (37) with extended stretching rods, together with a carriage (40) that carries the primary cylinder (37), is positioned by a secondary cylinder (41) or by a cam control system. In particular, it is envisioned that in place of the secondary cylinder (41), a cam control system will be used such a current stretching position is defined by a cam roller (42) that slides along a cam during the execution of the stretching process. The cam roller (42) can also be pressed against a guideway by a secondary cylinder (41). The carriage (40) slides along two guide elements (43).

Figure 3:
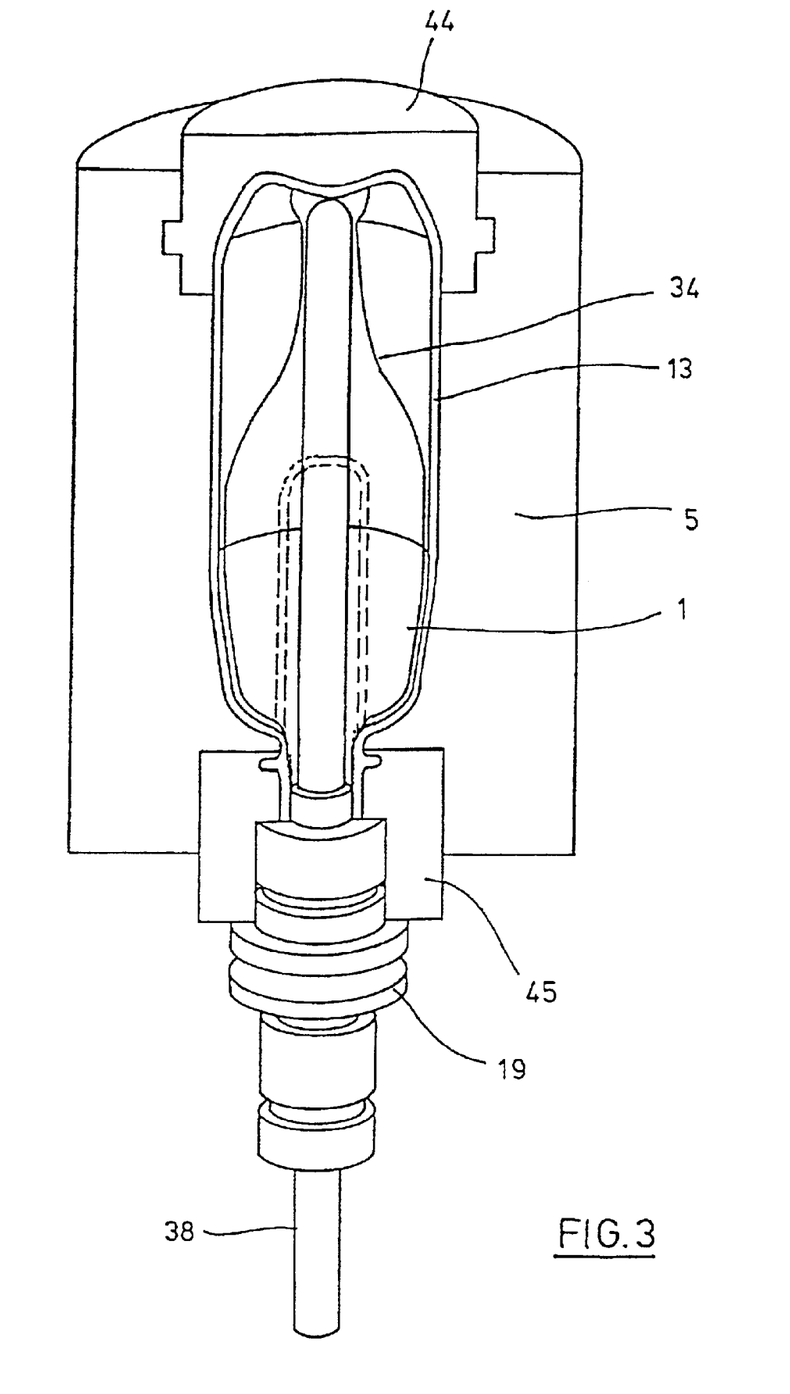
FIG. 3 is a cross-section through a blow station with a preform shown in position in an unblown state, a partially expanded state with a stretching rod positioned therein, and a finished, blow-formed container.

To facilitate placement of the preforms (1) in the blow station (3) and removal of the finished containers (13), the blow mould consists, in addition to the mould halves (8, 9), of a base section (44) that can be positioned by a lifting device. The preform (1) can be held in the area of the blow station (3) by a support element (19), for example a transport mandrel, which passes through a number of processing stations in the device together with the preform (1). However, it is also possible to place the preform (1) directly in the blow station (3), for example using grippers or other handling means.

As shown in FIG. 3, provision is made for the use of separate threaded inserts (45) in the area of the blow mould (3) to accommodate the various forms of mouth section of the preforms (1). In addition to the fully formed container (13), and the preform (1) shown in dashed lines, the developing blow (34) is also shown.

Figure 4:
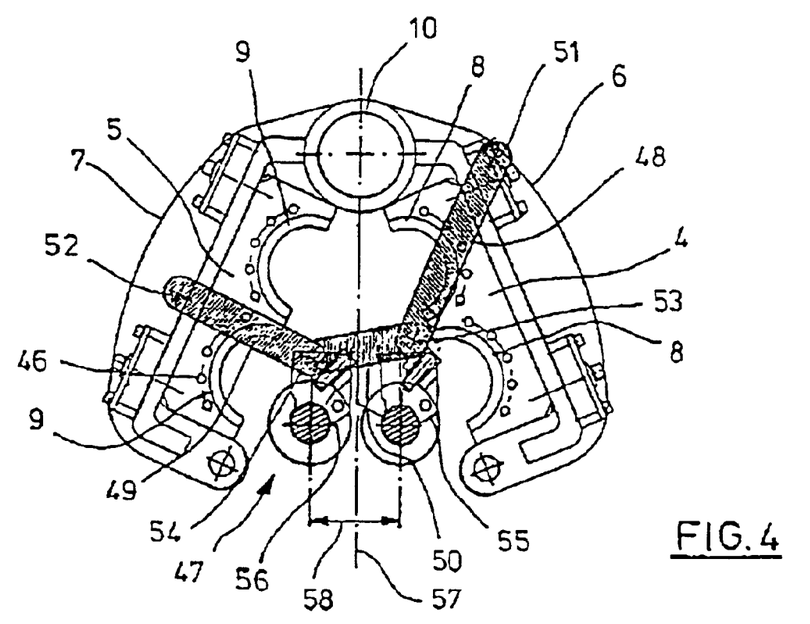
FIG. 4 is a horizontal cross-section through a blow station with a positioning element for two preforms or containers shown in operative relationship thereto in accordance with the present invention.

FIG. 4 shows a horizontal section through the blow station (3). In particular, it can be seen that multiple mould halves (8, 9) are provided in the area of each mould support (4, 5). Each pair of mould halves (8, 9) is arranged opposite to one another to form a cavity. The number of tools per blow station (3) thus corresponds to the number of containers (13) that can be produced at one time. In contrast to the use of a common tool for all containers (13) to be produced at one time, the embodiment shown has the advantage of greater modularity with the use of a larger number of simple components. Manufacturing cost can be reduced in this way.

Within the mould support (4, 5), coolant channels (46) for a circulating temperature control medium are shown behind each mould half (8, 9).

A positioning element (47) is used to handle the preforms (1) and the blow-formed containers (13) in the blow station (3). The positioning element (47) consists of two support levers (48, 49) and a transverse lever (50) that connects the support levers (48, 49) to one another. Each support lever (48, 49) is articulated at one end in the area of the support arms (6, 7) by means of swivel joints (51, 52). The support levers (48, 49) are connected to the transverse lever (50) by swivel joints (53, 54) located at the ends of the support levers (48, 49) opposite the swivel joints (51, 52).

A holding element (55, 56) for the preforms (1) or blow-formed containers (13) is located in the area of the end of each support lever (48, 49) facing the swivel joints (53, 54).

The longitudinal dimensioning of the levers (48, 49, 50) and the positioning of the swivel joints (51, 52, 53, 54) is arranged such that, in the operating state shown in FIG. 4, an arrangement of the holding elements (55, 56) results that is essentially perpendicular to a center line (57) of the blow station (3), and the center lines of the holding elements (55, 56) have a feed spacing (58) relative to one another.

Figure 5:
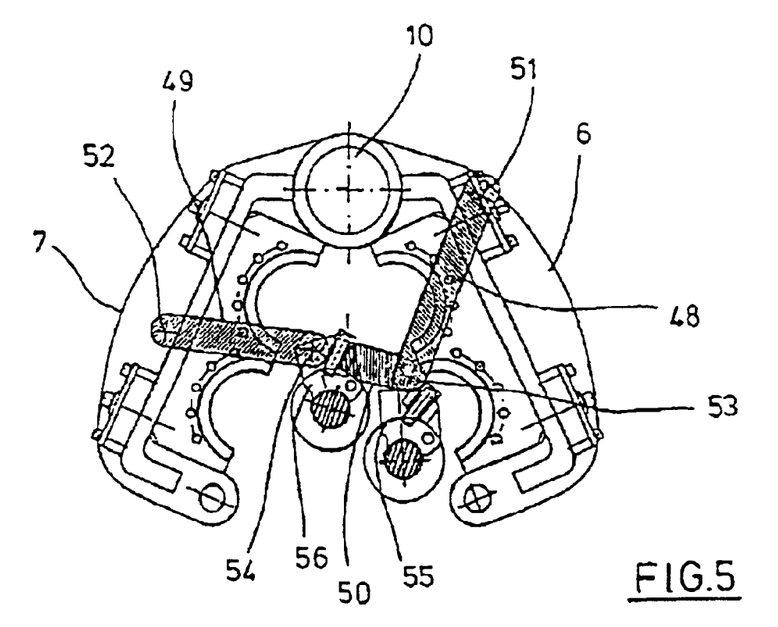
FIGS. 5 through 8 are views similar to that of FIG. 4 but showing the progressive movement of the positioning element within the blow station.

At the step shown in FIG. 5, the positioning element (47) has already begun its transfer motion by swinging of the individual components. Owing to the coupling of the levers (48, 49) by way of the swing articulations (51, 52) with the blow wheel (12), the motion of an associated cam roller simultaneously brings about a motion of the levers (48, 49, 50). By this motion of levers (50, 51, 52), a positioning of the holding elements (55, 56) occurs, together with supported blanks, into the blow station (3).

Figure 6:
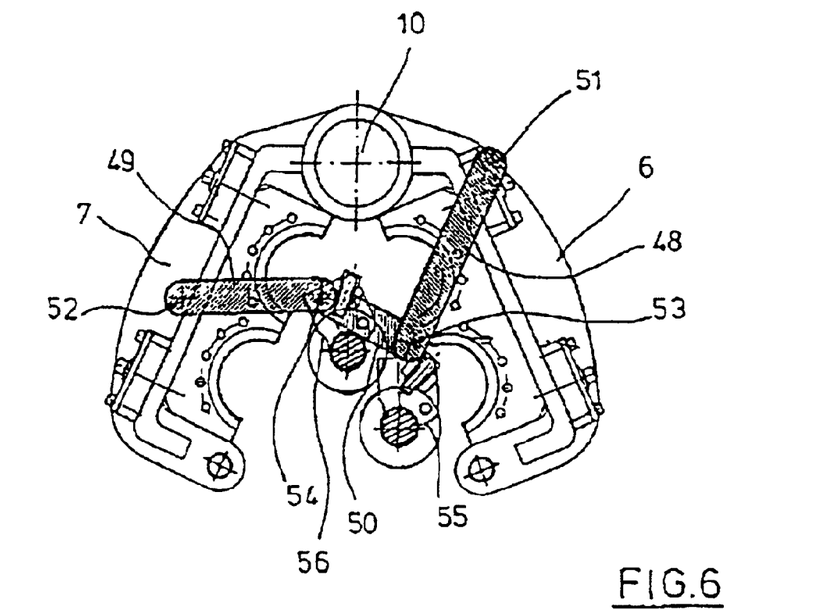
Figure 7:
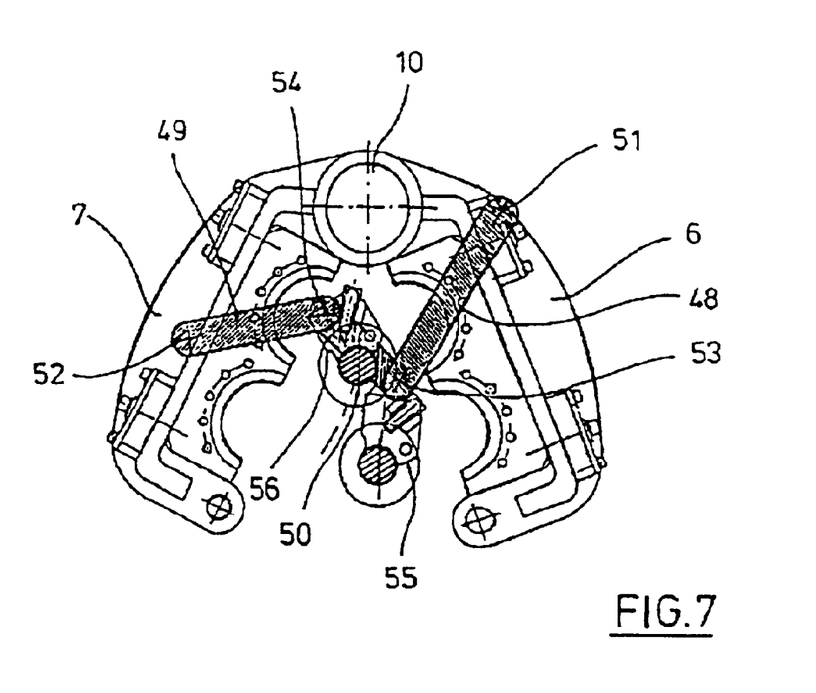

According to the step in FIG. 6, this inward motion of the holding elements (55, 56) into the blow station (3) is continued. A step taking place later in time is shown in FIG. 7. Here is may be seen in particular that meanwhile the spacing of the centerlines of the holding elements (55, 56) has increased relative to each other.

Figure 8:
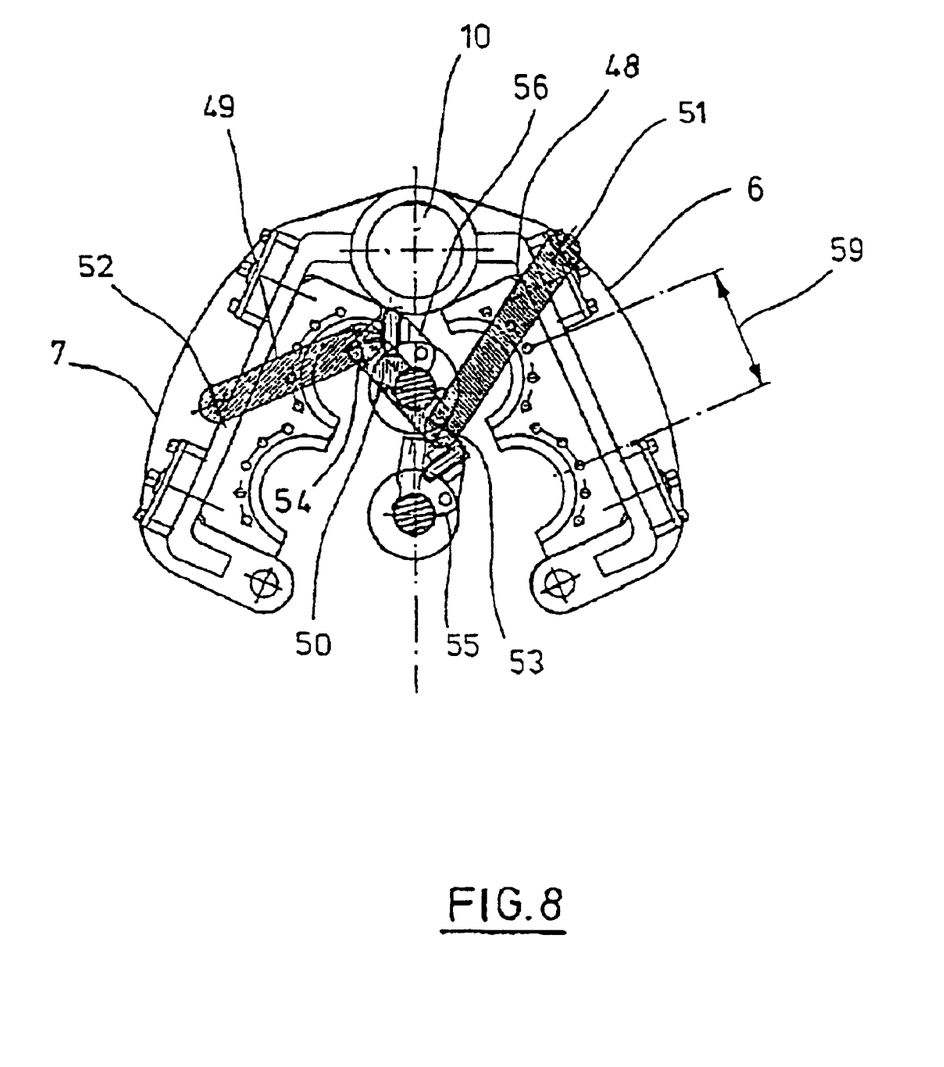

FIG. 8 shows the conclusion of the motion of the positioning element (47). Here a line connecting the centerlines of the holding elements (55, 56) substantially coincides with the centerline (57) of the blow station (3). A centerline spacing of the holding elements (55, 56) has increased, because of the swing motion executed, from the original input distance (58) to a blow distance (59). Upon closing of the blow station (3) by a swinging motion of the arms (6, 7), the centerlines of the holding elements (55, 56), and supported blanks (1), coincide with centerlines of the cavities, each bounded by pairs of half-molds (8, 9).

Figure 9:
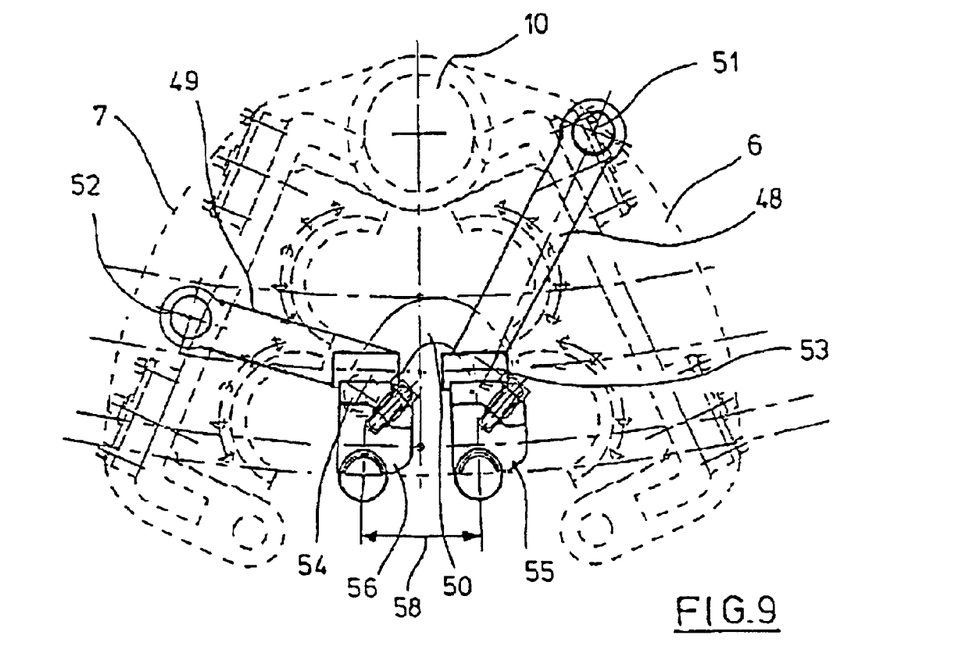
FIG. 9 is an enlarged view similar to that of FIG. 4 but with the mould halves shown in phantom and illustrating the initial spacing between the preforms.
Figure 10:
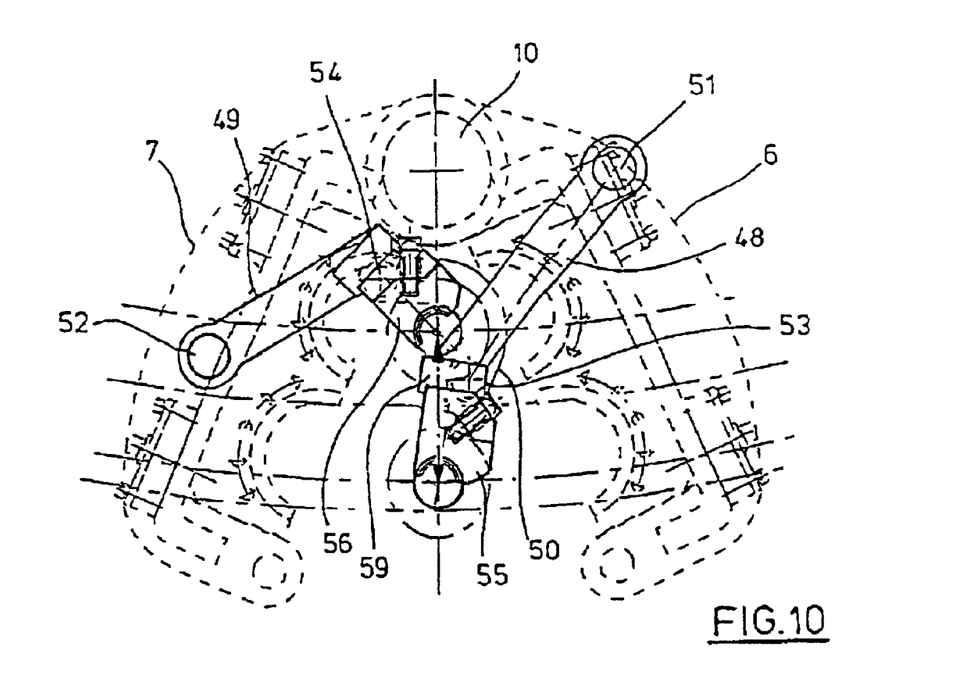
FIG. 10 is a view similar to that of FIG. 9 but showing the final spacing between the preforms just prior to closing of the moulds.

For further clarification, the input positioning and the output positioning are represented once again in FIG. 9 and FIG. 10. In particular, the holding elements (55, 56) arranged at the input distance (58) relative to each other may be seen in FIG. 9, as well as the holding elements (55, 56) after attaining the blow distance (59) in FIG. 10.

Through the proposed design conformation of the positioning element (47), it is possible in particular, using supporting elements (19) holding the blanks (1), or the containers (13), to perform a simultaneous transfer of at least two supporting elements (9, 10) from the transfer wheel (25) to the positioning element (47). This simultaneous transfer makes it possible to equip the transfer wheel (25) with transfer arms each holding at least two supporting elements (9, 10). In this way the number of transfer arms can be reduced correspondingly, or, while retaining the number of transfer arms, or reducing this number only in part, the rotational speed of the transfer wheel (25) can be decreased. Such a design conformation is especially significant for machines having a high production output.

Figure 11:
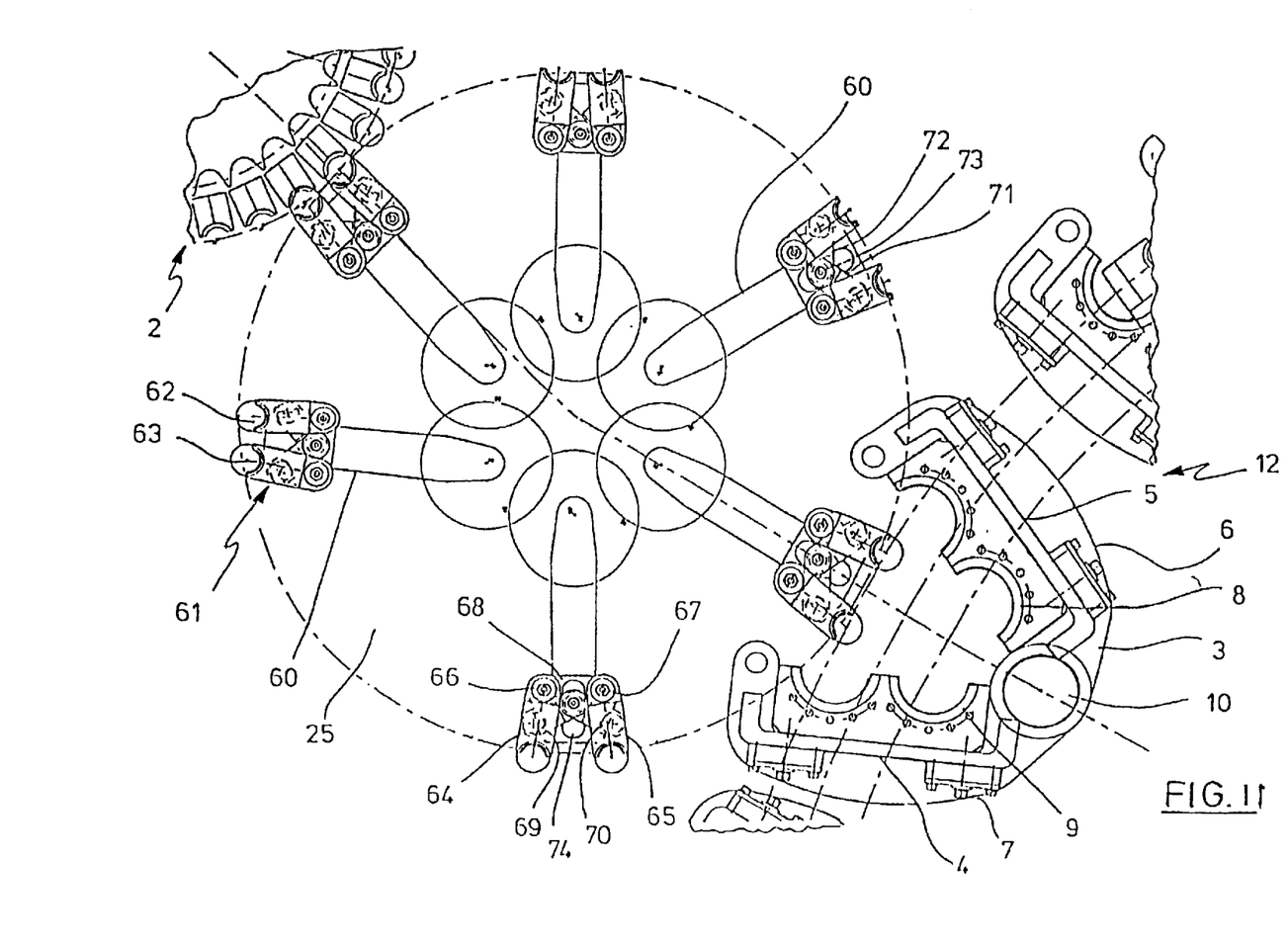
FIG. 11 is a top view of a transfer wheel for moving preforms between the heater unit and the blow wheel with spreader elements that are held by transfer arms being provided thereon in accordance with the present invention.

FIG. 11 shows an enlarged view of the design of the transfer wheel (25) located between the heater unit (2) and the blow wheel (12). It can be seen that the transfer wheel (25) has transfer arms (60), each of which holds a spreader element (61) that, in the embodiment shown, has two receptacle elements (62, 63) for preforms (1). The receptacle elements (62, 63) are located in the end regions of spreader levers (64, 65). The spreader levers (64, 65) are coupled by swivel joints (66, 67) in the area of their ends opposite the receptacle elements (62, 63) to a transverse segment (68) of the transfer arm (60).

An additional coupling to positioning levers (71, 72) is provided by swivel joints (69, 70). The swivel joints (69, 70) here are arranged between the swivel joints (66, 67) and the receptacle elements (62, 63). At their end regions opposite the swivel joints (69, 70), the positioning levers (71, 72) are rotatably coupled to an actuating element (73) that is carried in a longitudinal slot (74) of the transfer arm (60). The actuating element (73) is also connected to a cam roller in order to facilitate mechanical positioning.

The pivoting combination of the spreader levers (64, 65), the positioning levers (71, 72) and the transfer arm (60) and the actuating element (63) provides an articulated lever action. In this way, longitudinal motion of the actuating element (73) within the longitudinal slot (74) causes the receptacle elements (62, 63) to spread apart or to approach one another.

In particular, it can be seen from FIG. 11 that the spreader elements (61) transfer the preforms (1) from the heater unit (2) at the closest approach of the receptacle elements (62, 63) to one another that is permitted by the design. When the transfer wheel (25) subsequently rotates, there occur both a spreading of the spreader elements (61) and a pivoting of the transfer arms (60) relative to one another. This pivoting of the transfer arms (60) relative to one another achieves both an extended transfer time and improved kinematics in the area of the transfer of the preforms (1) from the heater unit (2) to the spreader elements (61) and during transfer of the preforms (1) from the spreader elements (61) to the positioning element (47).

In principle, several variations are conceivable in accomplishing a multi-stage spacing change of the preforms (1) and/or the blow-formed containers (13). In the variant shown in FIG. 5, a three-stage increase in spacing takes place. A first increase in spacing is performed in the area of the heater unit (2), since the support elements (19) circulating in the area of the heater unit (2) are spread in their regions holding the preforms (1) by the deflection that is provided. The second change in spacing takes place in the area of the transfer wheel (25), and the last stage of spacing change is implemented in the area of the blow station (3) by means of the positioning element (47).

Alternatively, it is also conceivable to provide only a two-stage increase in spacing. For example, it is conceivable to provide a first spacing increase in the area of the heater unit (2), then to transport the preforms (1) to the area of the transfer wheel (25) with initially constant spacing, and then to perform the second stage of spacing change in the area of the blow station (3). Likewise, it is possible to perform no spacing change in the area of the heater unit (2), and to implement the two stages of spacing change in the area of the transfer wheel (25) and in the area of the blow station (3). A multi-stage spacing change prior to the transfer of the preforms (1) to the blow station (3) is likewise possible.

Figure 12:
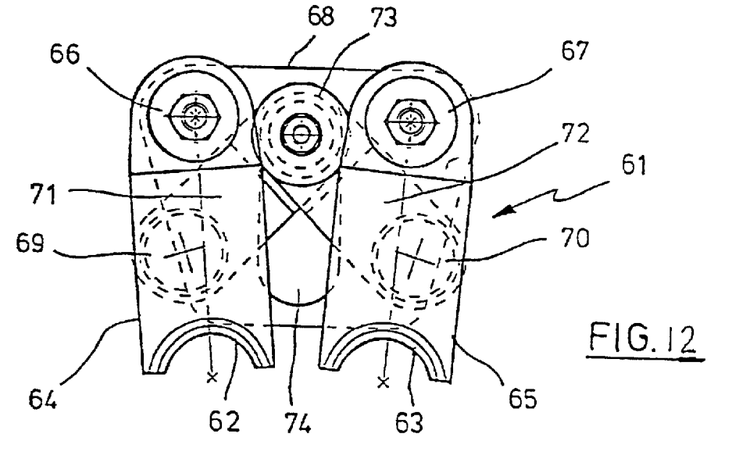
FIG. 12 is an enlarged fragmentary view of a spreader element in an arrangement of the holding elements with the closest possible spacing in accordance with the present invention.

FIG. 12 shows an enlarged view of the spreader element (61) at the closest possible approach of the receptacle elements (62, 63) to one another.

Figure 13:
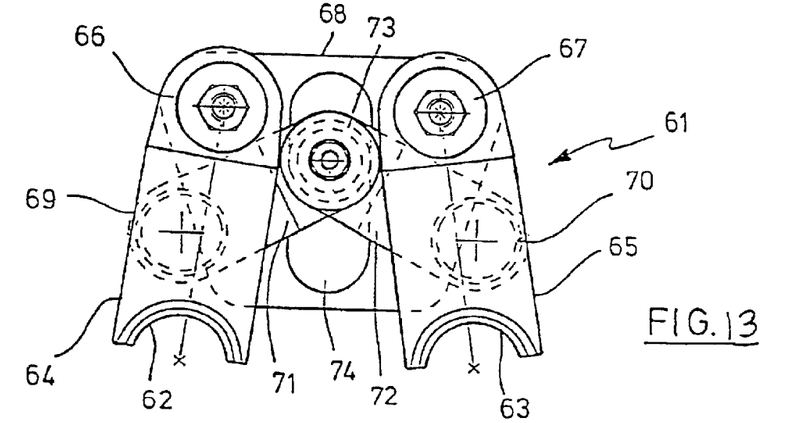
FIG. 13 is a view similar to that of FIG. 12 but showing the spreader element from FIG. 11 after partial spreading has been performed in accordance with the present invention.

As shown in FIG. 13, a partial displacement of the actuating element (73) within the longitudinal slot (74) has taken place; this has resulted in a spreading apart of the receptacle elements (62, 63).

Figure 14:
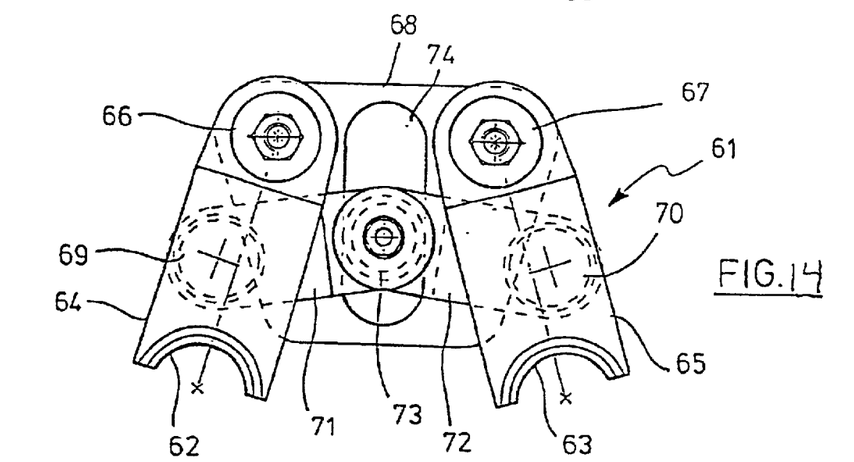
FIG. 14 is also a view similar to that of FIGS. 12 and 13 but showing the holding element from FIG. 11 and FIG. 12 just before a maximum spread position is reached in accordance with the present invention.

As shown in FIG. 14, further positioning of the actuating element (73) along the longitudinal slot (74) has nearly completed the spreading process.

It is useful for the motion of the actuator (73) in the longitudinal slot (74) to be accomplished by means of a cam roller that travels along associated cam segments as a function of the rotational motion of the transfer wheel (25). In this way, the motion processes can be performed with exact reproducibility.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A device for blow-forming containers of a thermoplastic material that has a heater unit for temperature treating preforms and at least one blow station equipped with mould supports that can be positioned relative to one another and wherein at least two cavities are located in the area of the blow station whose longitudinal axes have a spacing relative to one another that is larger than a spacing between the preform longitudinal axes of adjacent preforms (1) in the vicinity of the heater unit (2), characterized in that a positioning element (47) that changes the spacing of the preforms (1) relative to one another is located in the area of the blow station (3), and in that a spreader element that likewise modifies the spacing of the preforms (1) is also located between at least one heating element (16) in the area of the heater unit (2) and the blow station (3).

2. A device in accordance with claim 1, characterized in that the spreader element (61) is located in the vicinity of the heater unit (2).

3. A device in accordance with claim 1, characterized in that the spreader element (61) is arranged after the heater unit (2) in the transport direction of the preforms (1).

4. A device in accordance with claim 1, characterized in that the spreader element (61) is embodied as a chainlike deflection of support elements (19) for the preforms (1).

5. A device in accordance with claim 4, characterized in that the spreader element (61) has two spreader levers (64, 65) and an actuator (73).

6. A method in accordance with claim 5, characterized in that the spreader element (61) has positioning levers (71, 72) in addition to the spreader levers (64), and in that the positioning levers (71, 72) are pivotably connected to the spreader levers (64, 65) as well as to the actuator (73).

7. A method in accordance with claim 6, characterized in that the actuator (73) has a cam roller that can be acted upon by a mechanical cam control system.

8. A device in accordance with claim 1, characterized in that the spreader element (61) is located in the area of a transfer wheel (25).

9. A device in accordance with claim 8, characterized in that a plurality of spreader elements (61) is located in the area of the transfer wheel (25) and between the heater unit (2) and the blow wheel (12).

10. A device in accordance with claim 1, characterized in that the spreader element (61) has two spreader levers (64, 65) and an actuator (73).

11. A device in accordance with claim 10, characterized in that the spreader element (61) has positioning levers (71, 72) in addition to the spreader levers (64), and in that the positioning levers (71, 72) are pivotably connected to the spreader levers (64, 65) as well as to the actuator (73).

12. A device in accordance with claim 10, characterized in that the actuator (73) has a cam roller that can be acted upon by a mechanical cam control system.

13. A method for blow-forming containers of a thermoplastic material, wherein preforms are temperature-treated and shaped into containers in at least one blow station and wherein moulds to define the container shape are held by mould supports that can be positioned by support arms, and wherein at least two preforms are simultaneously shaped into containers within each blow station and are positioned such that the preforms assume a positioning relative to one another when entering the blow station that differs from the positioning during the blow forming process, characterized in that a spacing of the preforms (1) relative to one another is changed during transport between entry into the blow station (3) and blow positioning, and in that between at least one of the heating elements (16) that heat treats the preforms (1) and the blow station (3), at least one additional change in the spacing of adjacent preforms (1) relative to one another is performed.

14. A method in accordance with claim 13, characterized in that the additional spacing change is performed in the area of the heater unit (2).

15. A method in accordance with claim 13, characterized in that the additional spacing change is performed after the heater unit (2) in the direction of transport.

16. A method in accordance with claim 13, characterized in that the additional spacing change is performed in the area of a transfer wheel.

17. A method in accordance with claim 13, characterized in that a two-step spacing change is performed.

18. A method in accordance with claim 17, characterized in that the relative spacing of the preforms (1) is increased at every change of spacing.

19. A method in accordance with claim 13, characterized in that a three-step spacing change is performed.

20. A method in accordance with claim 19, characterized in that the relative spacing of the preforms (1) is increased at every change of spacing.

* * * * *